United States Patent
Lange

(10) Patent No.: US 10,086,876 B2
(45) Date of Patent: Oct. 2, 2018

(54) MOTOR VEHICLE BODY

(71) Applicant: GM GLOBAL TECHNOLOGY OPERATIONS LLC, Detroit, MI (US)

(72) Inventor: Marcus Lange, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 5 days.

(21) Appl. No.: 15/349,278

(22) Filed: Nov. 11, 2016

(65) Prior Publication Data
US 2017/0137065 A1    May 18, 2017

(30) Foreign Application Priority Data

Nov. 12, 2015 (DE) ........................ 10 2015 014 643

(51) Int. Cl.
| | |
|---|---|
| B62D 25/02 | (2006.01) |
| B62D 25/04 | (2006.01) |
| B62D 29/00 | (2006.01) |
| B62D 29/04 | (2006.01) |
| B62D 27/04 | (2006.01) |
| B62D 25/16 | (2006.01) |

(52) U.S. Cl.
CPC ........... *B62D 25/025* (2013.01); *B62D 25/04* (2013.01); *B62D 25/16* (2013.01); *B62D 27/04* (2013.01); *B62D 29/005* (2013.01); *B62D 29/007* (2013.01); *B62D 29/008* (2013.01); *B62D 29/04* (2013.01)

(58) Field of Classification Search
CPC ...... B62D 25/02; B62D 25/025; B62D 25/04; B62D 25/16; B62D 27/04; B62D 29/005; B62D 29/008

USPC ............ 296/181.2, 193.06, 198, 203.03, 209
See application file for complete search history.

(56) References Cited

U.S. PATENT DOCUMENTS

| | | | | |
|---|---|---|---|---|
| 5,927,786 A | * | 7/1999 | Kawai | B60R 13/0206 296/203.03 |
| 5,941,597 A | * | 8/1999 | Horiuchi | B62D 25/04 296/193.06 |
| 6,042,176 A | * | 3/2000 | Ikeda | B60J 3/0217 188/371 |
| 6,217,109 B1 | * | 4/2001 | Okana | B62D 25/025 296/187.12 |

(Continued)

FOREIGN PATENT DOCUMENTS

| | | |
|---|---|---|
| DE | 102010019999 A1 | 11/2011 |
| DE | 102014101323 A1 | 8/2015 |

(Continued)

OTHER PUBLICATIONS

English translation of DE 10 2010 019 999; retreived Dec. 19, 2017, via PatentTranslate located at www.epo.org. (Year: 2017).*

(Continued)

*Primary Examiner* — Jason S Daniels
(74) *Attorney, Agent, or Firm* — Lorenz & Kopf, LLP

(57) ABSTRACT

A motor vehicle body includes a steel support structure surrounding a passenger compartment and a sidewall covering the support structure. The sidewall includes a front and a rear fender, at least one of which is realized in the form of a lightweight component of light metal, as well as a steel roof frame element that borders on both fenders.

18 Claims, 2 Drawing Sheets

(56) References Cited

U.S. PATENT DOCUMENTS

| | | | | |
|---|---|---|---|---|
| 6,419,302 B2* | 7/2002 | Mikuni | ............... | B62D 25/00 |
| | | | | 296/187.01 |
| 9,428,227 B2* | 8/2016 | Jones | ............... | B62D 23/005 |
| 9,669,879 B2* | 6/2017 | Hofer | ............... | B62D 27/02 |

FOREIGN PATENT DOCUMENTS

| | | |
|---|---|---|
| DE | 102014103147 A1 | 9/2015 |
| EP | 1052164 A1 | 11/2000 |
| EP | 2457808 A1 | 5/2012 |

OTHER PUBLICATIONS

German Patent Office, German Search Report for German Application No. 102015014643.2, dated Aug. 12, 2016.

* cited by examiner

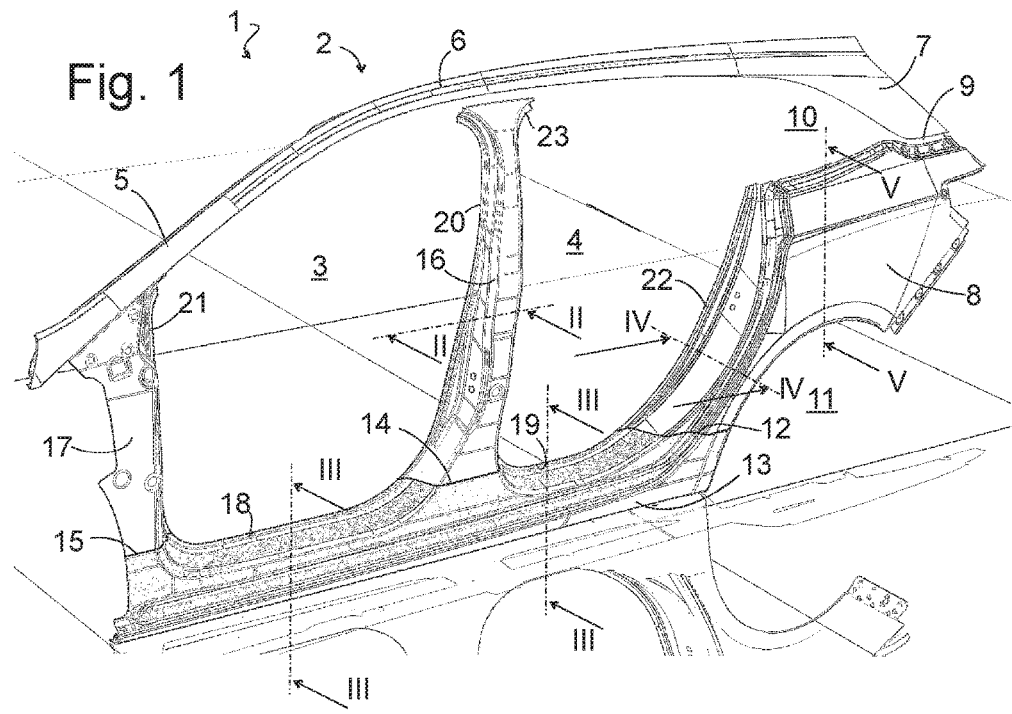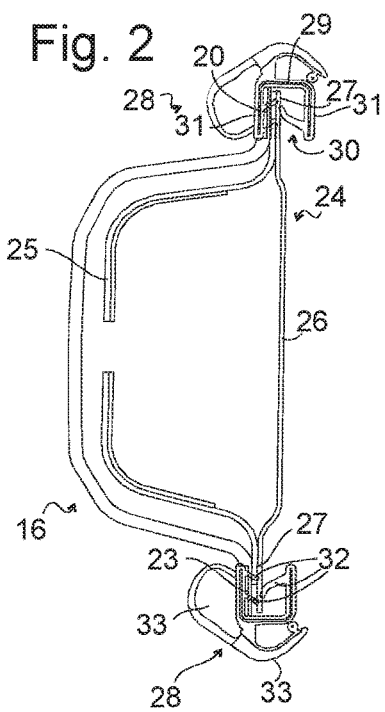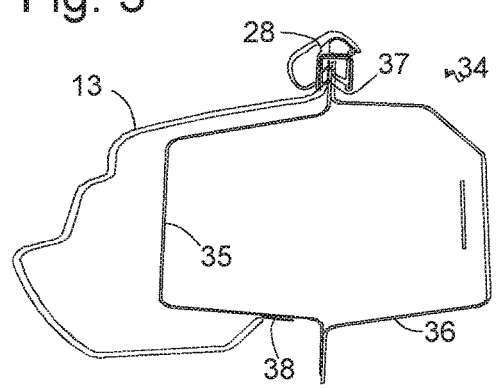

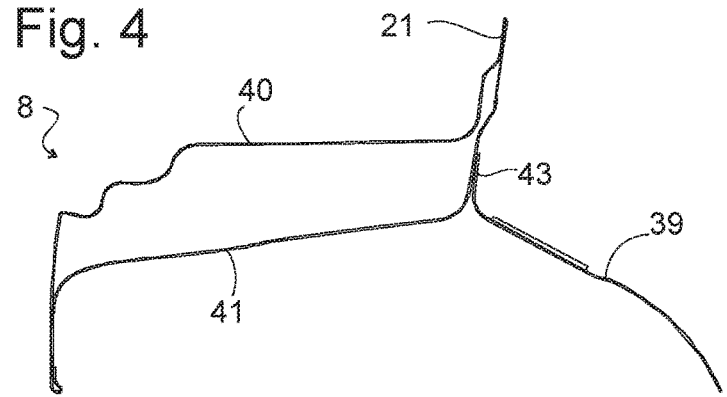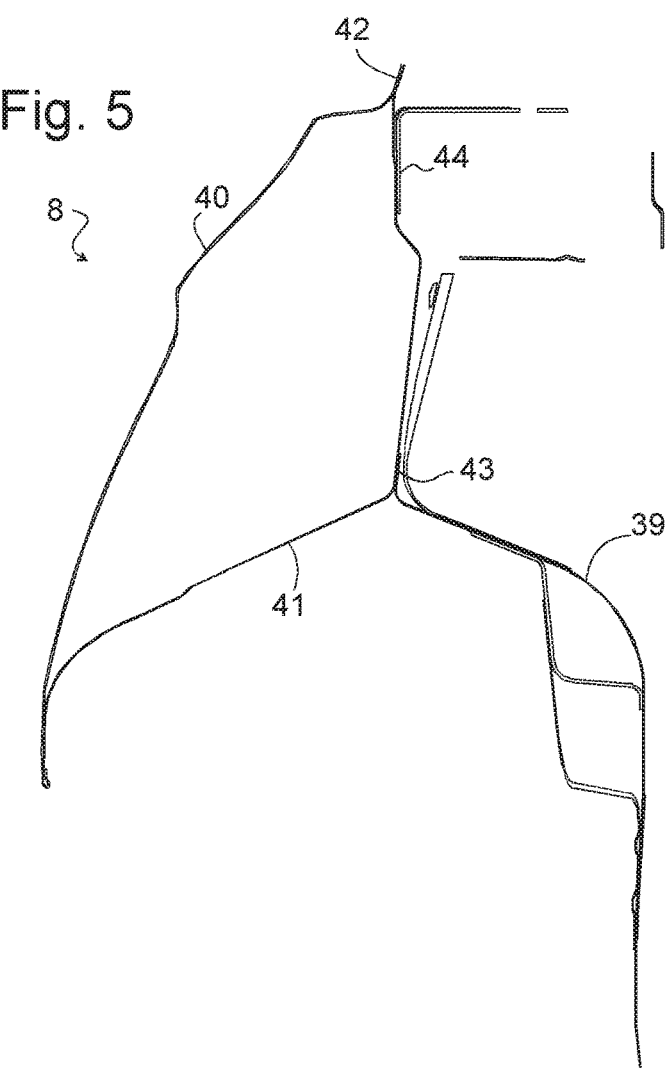

MOTOR VEHICLE BODY

CROSS-REFERENCE TO RELATED APPLICATION

This application claims priority to German Patent Application No. 102015014643.2, filed Nov. 12, 2015, which is incorporated herein by reference in its entirety.

TECHNICAL FIELD

The present disclosure pertains to a motor vehicle body, and in particular a lightweight body which utilizes light metal without compromising the dimensional stability of the passenger compartment.

BACKGROUND

One way for meeting the increasingly stringent legal requirements with respect to the fuel consumption of vehicles is to reduce the weight of the vehicles by replacing their components, which are conventionally made of steel, with light metal or plastic components. DE 10 2010 019 999 A1 discloses a motor vehicle body, in which a steel support structure surrounding a passenger compartment is covered with planking parts of aluminum. Among other things, these planking parts include an outer wall section that extends around front and rear door cutouts on a side of the vehicle. However, the coefficients of thermal expansion of steel and aluminum differ significantly such that the length increase of such an outer wall section can be several millimeters greater than that of the underlying steel support structure when the vehicle body is subjected to a high temperature, e.g. while drying the paint applied thereon. Consequently, there is a significant risk of the outer wall section locally distorting to such a degree that permanently visible traces remain when it is subjected to a high temperature.

SUMMARY

According to the present disclosure a motor vehicle body is disclosed, the weight of which is reduced due to the utilization of light metal without compromising the dimensional stability of the passenger compartment. In particular, the risk of a thermally induced distortion of the light metal leaving visible traces thereon is simultaneously minimized.

According to an embodiment of the present disclosure, a motor vehicle body includes a steel support structure surrounding a passenger compartment and a sidewall covering the support structure. The sidewall includes a front and a rear fender, at least one of which is realized in the form of a lightweight component of light metal, as well as a steel roof frame element that borders on both fenders. Due to the fact that the roof frame element connects the two fenders, it is elongated in the longitudinal direction of the vehicle and simultaneously narrow such that it is on the one hand subjected to particularly high stresses in case its coefficient of thermal expansion differs from that of the steel support structure, but can on the other hand also be very easily distorted due to its small lateral dimension. Since the roof frame element is made of steel, it is protected from thermally induced tensions and a resulting distortion, wherein the contribution of the roof frame element to the overall weight of the body is due to its small lateral dimension so low that the issue of whether the roof frame element is made of steel or of light metal only has little influence to the overall weight of the body. The fact that the at least one fender is made of light metal has due to its large surface area a greater influence on the body weight. A thermal expansion that differs from that of the support structure only has a relatively insignificant effect on this fender due to its compact shape such that the fender only has a low tendency of permanently distorting under thermal stress.

If the lightweight component of light metal includes a visible and a concealed metal sheet, only the concealed metal sheet is preferably anchored to the support structure. In this way, thermal stresses resulting from the connection of the light metal to the steel support structure are essentially limited to the concealed metal sheet and the visible metal sheet is protected from a potentially conspicuous deformation.

In order to compensate different thermal expansions of the support structure and the fender, the roof frame element and the at least one fender should be separated by an expansion gap.

The sidewall may furthermore include a B-column cover that is likewise realized in the form of a lightweight component made of light metal or plastic. A door sill cover of the sidewall may also be realized in the form of a lightweight component that, however, is preferably made of plastic rather than light metal.

The support structure may include an elongate carrier flange on an edge of a door opening in order to mount parts of the sidewall. At least one of the lightweight components may include a contact flange that is held in contact with the carrier flange of the support structure by an elastic groove profile attached to the carrier flange and the contact flange. Such a groove profile can on the one hand ensure a rigid seat of the lightweight component on the support structure, but on the other hand also makes it possible to reduce thermal stresses in that the carrier flange and the contact flange can shift relative to one another along their contacting surfaces.

The groove profile may include a clip with two legs that encompass a groove for accommodating the carrier flange and the contact flange on both sides. In order to ensure a rigid seat of the flanges on one another, the groove profile may furthermore include an elastically compressed element between one of the legs and the carrier flange and/or an elastically compressed element between the other leg and the contact flange. The carrier flange may be in contact with contact flanges of different lightweight components over its length; in this way, the flanges can form a frame that extends around the door opening.

According to a preferred embodiment, the aforementioned groove profile is simultaneously realized in the form of a door seal profile. The door seal profile preferably extends around the door opening over the entire length of the adjoining carrier and contact flanges.

The B-column cover may form one of the different lightweight components that are in contact with the carrier flange. In this case, a second contact flange of the B-column cover is preferably held on a second door opening by a second groove profile.

If the lightweight component consists of a door sill cover, a second flange of the door sill cover, which faces away from the door opening, is preferably bonded on the support structure.

BRIEF DESCRIPTION OF THE DRAWINGS

The present disclosure will hereinafter be described in conjunction with the following drawing figures, wherein like numerals denote like elements.

FIG. 1 shows a side view of an inventive motor vehicle body;

FIG. 2 shows a section through the sidewall and the underlying support structure along the plane II-II in FIG. 1;

FIG. 3 shows a section along the plane II-III;

FIG. 4 shows a section along the plane IV-IV; and

FIG. 5 shows a section along the plane V-V in FIG. 1.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The sidewall 1 of a motor vehicle body illustrated in FIG. 1 includes multiple components that are not directly connected to one another, but rather only by an underlying support structure that is not visible in FIG. 1 and conventionally forms a frame around a passenger compartment. The components of the sidewall include a roof frame element 2 that is made of steel analogous to the underlying support structure and continuously extends in one piece over the entire length of the passenger compartment, i.e. over a front and a rear door opening 3 and 4. In a front region 5, the roof frame element 2 forms a cover of the upper part of an A-column of the support structure extending between windshield and side window. A central region 6 forms a lateral end of the roof surface and a rear region 7 forms a cover of a C-column.

A rear fender 8 made of light metal sheet, particularly an aluminum sheet, is separated from the lower edge of the rear region 7 by an expansion gap 9. In FIG. 1, the roof frame element 2 is illustrated in a position, in which it is slightly shifted upward relative to its position on the finished motor vehicle body, such that the expansion gap 9 appears wider in the figure than on the finished body and an upper edge of the fender 8, which is otherwise concealed by the rear region 7 on the completely assembled vehicle, is exposed. The upper boundary of the rear fender 8 is formed by a rear window opening 10 and a rear door opening 4 and its lower boundary is formed by a rear wheel cutout 11.

The fender 8 borders on a door sill cover 13 molded of plastic along a lower edge 12 between the rear wheel cutout 11 and the door opening 4. Edges 14, 15, at which the door sill cover 13 and a B-column cover 16, as well as the door sill 13 and a cover 17 of the lower part of the A-column, respectively border on one another, extend at approximately the same height as the edge 12.

The upper edge of the door sill 13 bordering on the front and rear door openings 3, 4 is respectively formed by vertical flanges 18, 19 that are elongated in the longitudinal direction of the vehicle and referred to as contact flanges below. A contact flange 20 extending upward from the front edge of the B-column cover 16 flushly adjoins the contact flange 18 and is on its upper end extended by a flange of the roof frame element 2 that is concealed in FIG. 1. Only a small part of a contact flange 21 of the cover 17, which once again flushly extends between the contact flange 18 and the flange of the roof frame element 2, is visible in this figure.

The contact flange 19, a contact flange 22 of the rear fender 8, a contact flange 23 on the rear edge of the B-column cover 16 and a once again concealed flange of the roof frame element 2 form a frame around the rear door opening 4 analogous to the contact flanges 18, 20, 21.

The sidewall furthermore includes a front fender, which like the rear fender 8 is made of an aluminum sheet. This front fender conventionally extends in front of the front ends of the roof frame element 2 and the door sill cover 13 and is at least spaced apart from the roof frame element 2 by an expansion gap.

FIG. 2 shows a section through the B-column cover 16 and the B-column 24 of the support structure covered thereby. The B-column 24 is composed of two sheet metal walls 25, 26 that are welded together along their front and rear edges referred to the longitudinal direction of the vehicle in order to form a hollow profile with forwardly and rearwardly protruding carrier flanges 27. The respective flanges 20 and 23 of the B-column cover 16 adjoin the carrier flanges 27. They are fixed on the carrier flanges 27 by two door seal profiles 28 that respectively extend around the door openings 3, 4 in a seamless fashion.

The door seal profiles 28 respectively include a groove profile 30 that is reinforced with an inserted metal rail 29, wherein elastic lips 32 respectively engage into the groove from the two opposing legs 31 of the groove profile. In FIG. 2, the lips 32 are illustrated in the relaxed position; once the respective flanges 20, 27 and 23, 27 are inserted into the groove profile 30, they are pressed against one another by the elastically deflected lips 32 such that the B-column cover 16 is held in contact with the carrier flanges 27, but the respective flanges 20, 27 and 23, 27 can still slide along one another in order to reduce potential thermal stresses caused by the different coefficients of thermal expansion of the plastic B-column cover 16 and the steel B-column 24. Hollow profiles 33 formed on an outer side of the groove profile 30 are conventionally provided for producing seals along the doors that are not illustrated in the figures and engage into the respective door openings 3 and 4.

FIG. 3 shows a section through the door sill cover 13 and an underlying door sill 34 along the plane III-III in FIG. 1. Analogous to the B-column 24, the door sill 34 is also composed of two metal sheets 35, 36 that are welded to one another along upwardly and downwardly protruding flanges. The upper of these two flanges acts as a carrier flange 37 that is in contact with the respective flanges 18 and 19 of the door sill cover 13 and held by the door seal profile 28 extending around the door openings 3, 4. A lower flange 38 of the door sill cover 13 is bonded along an underside of the outer sheet metal wall 35. The bond extends continuously over the entire length of the flange 38 such that thermal stresses can occur along this bond due to different coefficients of thermal expansion of the sheet metal wall 35 and the door sill cover 13; since plastic has a relatively high elasticity in comparison with a light metal sheet, however, the door sill cover 13 is able to adapt to the thermal expansion of the sheet metal wall 36 along the flange 35 without tearing or buckling.

FIGS. 4 and 5 shows two sections through the rear fender 8 of light metal and underlying parts of the support structure, in this case a wheel well 39, along different planes IV-IV and V-V. Similar to the B-column 24 and the door sill 34, the fender 8 is composed of an outer sheet metal wall 40 and an inner sheet metal wall 41 that are connected to one another along their edges. On their edges facing the rear door opening 4, the welded sheet metal walls 40, 41 form the contact flange 21 as shown in FIG. 4 and a corresponding flange 42 extends along an upper edge of the sheet metal walls 40, 41 bordering on the rear window opening 10 as shown in FIG. 5. On its lower edge bordering on the rear wheel cutout 11, the outer sheet metal wall 40 is beaded around the edge of the inner sheet metal wall 41. Only the inner sheet metal wall 41 is mounted on the flanges 43, 44 of the steel wheel well 37 such that thermal stresses occurring along these flanges 43, 44 are limited to the inner sheet metal wall 41 and cannot lead to a visible distortion of the outer sheet metal wall 40.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle body comprising:
    a steel support structure surrounding a passenger compartment; and
    a sidewall covering the support structure, wherein the sidewall comprises:
        a fender realized in the form of a lightweight component of light metal, the fender including a concealed metal sheet and a visible metal sheet that are attached at a first peripheral edge and a second peripheral edge of the fender, the first peripheral edge being opposite the second peripheral edge, the concealed metal sheet including an intermediate area between the first peripheral edge and the second peripheral edge, the intermediate area of the concealed metal sheet attached to the support structure, the first peripheral edge, the second peripheral edge, and the visible metal sheet being indirectly attached to the support structure, and
        a steel roof frame element that borders the fender.

2. The motor vehicle body according to claim 1, wherein at least one of the first peripheral edge and the second peripheral edge includes a flange at which the concealed metal sheet is layered on and attached to the visible metal sheet.

3. The motor vehicle body according to claim 2, wherein the flange includes a weldment that attaches the concealed metal sheet and the visible metal sheet.

4. The motor vehicle body according to claim 3, wherein the first peripheral edge includes the flange, and wherein the second peripheral edge includes a bead at which the concealed metal sheet and the visible metal sheet are attached; wherein, at the bead, the visible metal sheet forms a hem flange around the concealed metal sheet.

5. The motor vehicle body according to claim 4, wherein the intermediate area of the concealed metal sheet is spaced apart from the visible metal sheet to define a cavity therebetween.

6. The motor vehicle body according to claim 1, wherein the roof frame element and the first peripheral edge of the fender are separated by an expansion gap.

7. The motor vehicle body according to claim 1, wherein the sidewall further comprises a B-column cover realized in the form of a lightweight component of a material selected from the group consisting of a light metal or plastic.

8. The motor vehicle body according to claim 1, wherein the sidewall further comprises a door sill cover realized in the form of a lightweight component of plastic.

9. The motor vehicle body according to claim 1, wherein the support structure comprises an elongate carrier flange on an edge of a door opening and the lightweight components comprises a contact flange, wherein said flanges are held in contact with one another by an elastic groove profile attached to both flanges.

10. The motor vehicle body according to claim 9, wherein the groove profile comprises a clip with two legs that encompass a groove for accommodating the carrier flange and the contact flange on both sides, an elastically compressed element between at least one of the legs and the carrier flange or the contact flange.

11. The motor vehicle body according to claim 10, wherein the clip attaches the carrier flange and the contact flange and allows for sliding movement of the carrier flange on the contact flange.

12. The motor vehicle body according to claim 9, wherein the carrier flange extends around the door opening and at least a part of the carrier flange is in contact with different lightweight components.

13. The motor vehicle body according to claim 9, wherein the groove profile comprises a door seal profile.

14. The motor vehicle body according to claim 9, wherein the sidewall further comprises a B-column cover realized in the form of a lightweight component of a material selected from the group consisting of a light metal or plastic, wherein the at least one lightweight component is the B-column cover, and a second contact flange of the B-column cover is held on the second door opening by a second groove profile.

15. The motor vehicle body according to claim 9, wherein the sidewall further comprises a door sill cover realized in the form of a lightweight component of plastic, wherein the at least one lightweight component is the door sill cover, and in that a second flange of the door sill cover facing away from the door opening is bonded on the support structure.

16. The motor vehicle body according to claim 1, wherein the fender partly defines a door opening, a window opening, and a wheel well.

17. A motor vehicle body comprising:
    a steel support structure surrounding a passenger compartment, the support structure including a first carrier flange and a second carrier flange, the first and second carrier flanges defining respective portions of a door opening; and
    a sidewall covering the support structure, wherein the sidewall comprises:
        a fender realized in the form of a lightweight component of light metal, the fender including a concealed metal sheet and a visible metal sheet that are welded at a first peripheral edge flange and attached at a second peripheral edge bead, the first peripheral edge flange defining at least part of a rear door opening and at least part of a rear window opening, the second peripheral edge bead defining at least part of a wheel well, the concealed metal sheet including an intermediate area between the first peripheral edge flange and the second peripheral edge bead, the intermediate area of the concealed metal sheet attached to the support structure, the first peripheral edge flange, the second peripheral edge bead, and the visible metal sheet being indirectly attached to the support structure;
        a B-column cover realized in the form of a lightweight component of a material selected from the group consisting of a light metal or plastic, the B-column cover including a first contact flange that is attached to the first carrier flange by a first elastic groove profile, the first elastic groove profile allowing sliding movement of the first contact flange on the first carrier flange;

a steel roof frame element that borders the fender and the B-column cover; and a door sill cover realized in the form of a lightweight component of plastic, the door sill cover including a second contact flange and a third flange, the second contact flange attached to the second carrier flange by a second elastic groove profile, the second elastic groove profile allowing sliding movement of the second contact flange on the second carrier flange, the third flange bonded to the support structure;

the first elastic groove profile including a first clip with two legs that encompass a first groove for accommodating the first carrier flange and the first contact flange, an elastically compressed first element between at least one of the legs and the first carrier flange or the first contact flange; and the second elastic groove profile including a second clip with two legs that encompass a second groove for accommodating the second carrier flange and the second contact flange, an elastically compressed second element between at least one of the legs and the second carrier flange or the second contact flange.

18. The motor vehicle body according to claim 17, wherein the roof frame element and the first peripheral edge flange of the fender are separated by an expansion gap.

\* \* \* \* \*